(12) United States Patent
Frenznick et al.

(10) Patent No.: US 10,926,633 B2
(45) Date of Patent: Feb. 23, 2021

(54) METHOD OF CONTROLLING A TANDEM AXLE ASSEMBLY

(71) Applicant: Dana Heavy Vehicle Systems Group, LLC, Maumee, OH (US)

(72) Inventors: Jeremy M. Frenznick, Brighton, MI (US); Steven Mastroianni, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 189 days.

(21) Appl. No.: 16/202,186

(22) Filed: Nov. 28, 2018

(65) Prior Publication Data

US 2020/0164743 A1    May 28, 2020

(51) Int. Cl.

| | |
|---|---|
| *B60K 23/08* | (2006.01) |
| *B60K 17/36* | (2006.01) |
| *B60B 35/14* | (2006.01) |
| *B60K 23/04* | (2006.01) |
| *F16H 48/05* | (2012.01) |
| *F16H 48/30* | (2012.01) |
| *F16D 48/06* | (2006.01) |

(52) U.S. Cl.
CPC .......... *B60K 23/0808* (2013.01); *B60B 35/14* (2013.01); *B60K 17/36* (2013.01); *B60K 23/04* (2013.01); *F16D 48/06* (2013.01); *F16H 48/05* (2013.01); *F16H 48/30* (2013.01); *B60K 2023/046* (2013.01); *B60K 2023/085* (2013.01); *B60K 2023/0841* (2013.01); *F16D 2500/3108* (2013.01)

(58) Field of Classification Search
CPC .... B60K 23/08; B60K 23/0808; B60K 17/36; F16H 48/05; F16H 59/44; F16H 61/08; F16D 48/06
See application file for complete search history.

(56) References Cited

U.S. PATENT DOCUMENTS

| | | |
|---|---|---|
| 6,085,138 A | 7/2000 | Smith et al. |
| 6,336,069 B1 | 1/2002 | Hasegawa et al. |
| 8,312,956 B2 | 11/2012 | Rindfleisch |
| 8,398,520 B1 | 3/2013 | Bassi et al. |

(Continued)

FOREIGN PATENT DOCUMENTS

| | | |
|---|---|---|
| GB | 2530877 A | 6/2016 |
| WO | 2013141893 A1 | 9/2013 |

*Primary Examiner* — Edwin A Young
(74) *Attorney, Agent, or Firm* — McCoy Russell LLP

(57) ABSTRACT

Methods of controlling a tandem axle assembly in a vehicle, the tandem axle assembly including an inter-axle differential (IAD), one or more side gears, and a front tandem axle assembly having a pair of front tandem axle half shafts selectively connected to a pair of front tandem axle wheel hub assemblies. When a determined speed of the vehicle is greater or equal to a predetermined speed, the IAD may be locked, the tandem axle wheel hub assemblies may be disconnected from their respective tandem axle shafts, and/or the IAD may be moved out of engagement with the one or more side gears. When a determined speed of the vehicle is less than a predetermined speed, the IAD may be unlocked, the tandem axle wheel hub assemblies may be connected to their respective tandem axle shafts, and/or the IAD may be engaged with the one or more side gears.

18 Claims, 7 Drawing Sheets

(56) References Cited

U.S. PATENT DOCUMENTS

| | | |
|---|---|---|
| 9,162,569 B2 | 10/2015 | Dean |
| 9,579,975 B2 | 2/2017 | Ekonen et al. |
| 9,821,780 B2 | 11/2017 | Korson et al. |
| 9,994,249 B2 * | 6/2018 | Kageyama ............. B62D 5/046 |
| 2010/0248888 A1 | 9/2010 | Hamperl et al. |
| 2015/0266375 A1 | 9/2015 | Tavvala et al. |
| 2019/0331173 A1 | 10/2019 | Eschenburg et al. |
| 2020/0047613 A1 * | 2/2020 | Eschenburg ........... B60K 17/36 |

* cited by examiner

METHOD OF CONTROLLING A TANDEM AXLE ASSEMBLY

FIELD

The present disclosure relates to methods of controlling a tandem axle assembly in a tandem axle vehicle.

BACKGROUND

Vehicles having multiple drive axle assemblies may be configured to distribute torque either proportionally or disproportionally between the axles. An inter-axle differential (IAD) connected to an IAD lock is commonly used in such vehicles to split the torque between the axles by locking or unlocking the IAD lock.

Various mechanisms can be used in these vehicles to allow a user to transition from single axle operation to multiple axle operation by engaging and disengaging one or more of the drive axles. Conventional mechanisms for connecting and disconnecting drive axles occur through the axle shaft. Some of these mechanisms require an axle or coupling mechanism to be moved in and out of place in order to disconnect the axle and transition between different driving modes. These mechanisms are costly, time-consuming, and cumbersome.

Other mechanisms allow a user to selectively split the torque between the axles, without manually moving an axle, by disconnecting an axle shaft while the IAD remains locked. However, these mechanisms maintain an extra load on the engine since the wheels will continue to spin the front axle, the differential, and the driveshaft. The extra load results in increased mechanical resistance on the drivetrain and fuel inefficiency to the vehicle.

Therefore, it would be advantageous to develop a method of controlling a tandem axle assembly in a vehicle that is fuel-efficient and responsive to the speed of the vehicle. It would also be advantageous to develop a method of controlling a tandem axle assembly in a vehicle without requiring the user to stop the vehicle.

SUMMARY

A method of controlling a tandem axle assembly in a vehicle, the tandem axle assembly including an inter-axle differential locking assembly including an inter-axle differential (IAD), a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies. The method includes the steps of determining a speed of the vehicle; comparing the determined speed of the vehicle to a predetermined speed; commanding the IAD to lock and one or more of the front tandem axle wheel hub assemblies to disconnect from one or more of the front tandem axle half shafts and/or one or more of the rear tandem axle wheel hub assemblies to disconnect from one or more of the rear tandem axle half shafts when the determined speed of the vehicle is greater or equal to the predetermined speed; and commanding the IAD to unlock and front tandem axle wheel hub assemblies to connect to the front tandem axle half shafts and/or rear tandem axle wheel hub assemblies to connect to the rear tandem axle half shafts when the determined speed is lower than the predetermined speed.

In another embodiment, the method of controlling a tandem axle assembly in a vehicle, the tandem axle assembly including an inter-axle differential locking assembly including an inter-axle differential (IAD), a helical side gear, a plurality of helical side gear teeth, a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies. The method includes the steps of determining a speed of the vehicle; comparing the determined speed of the vehicle to a predetermined speed; commanding the one or more front tandem axle wheel hub assemblies to disconnect from one or more of the front tandem axle half shafts; the IAD to move out of engagement with the helical side gear; and the IAD to lock when the determined speed of the vehicle is greater or equal to the predetermined speed; and commanding one or more of the front tandem axle wheel hub assemblies to connect to one or more of the front tandem axle half shafts; the IAD to engage with the helical side gear; and the IAD to unlock when the determined speed of the vehicle is lower than the predetermined speed.

In yet another embodiment, the method of controlling a tandem axle assembly in a vehicle, the tandem axle assembly including an intermediate shaft, an inter-axle differential (IAD) drivingly connected to the intermediate shaft, an intermediate shaft side gear, a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies. The method includes the steps of determining a speed of the vehicle; comparing the determined speed of the vehicle to a predetermined speed; commanding one or more of the rear tandem axle wheel hub assemblies to disconnect from one or more of the rear tandem axle half shafts; the IAD to move out of engagement with the intermediate shaft side gear; and the IAD to lock when the determined speed of the vehicle is greater or equal to the predetermined speed; and commanding the one or more rear tandem axle wheel hub assemblies to connect to the one or more rear tandem axle half shafts; the IAD to engage with the helical side gear; and the IAD to unlock when the determined speed of the vehicle is lower than the predetermined speed.

In some embodiments, the pair of front tandem axle wheel hub assemblies and/or rear tandem axle wheel hub assemblies include one or more automatic locking hubs directly mounted to one or more wheels, one or more clutch members movable relative to the one or more automatic locking hubs and the pair of front tandem axle half shafts, and one or more actuators selectively operable to induce axial movement of the one or more automatic locking hubs.

In some embodiments, determining the speed of the vehicle includes measuring the rotational speed of a sliding clutch, a differential ring gear, one of the front tandem axle half shafts, and/or one of the rear tandem axle half shafts.

In some embodiments, inter-axle differential locking system includes a helical side gear and a sliding clutch, wherein the helical side gear includes a plurality of helical side gear teeth and the sliding clutch includes a plurality of sliding clutch teeth, and wherein the sliding clutch teeth are selectively engaged with the helical side gear teeth. The IAD may be locked when the sliding clutch teeth are engaged with the helical side gear teeth and the IAD may be unlocked when sliding clutch teeth are disengaged from the helical side gear teeth.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

Figure 1:
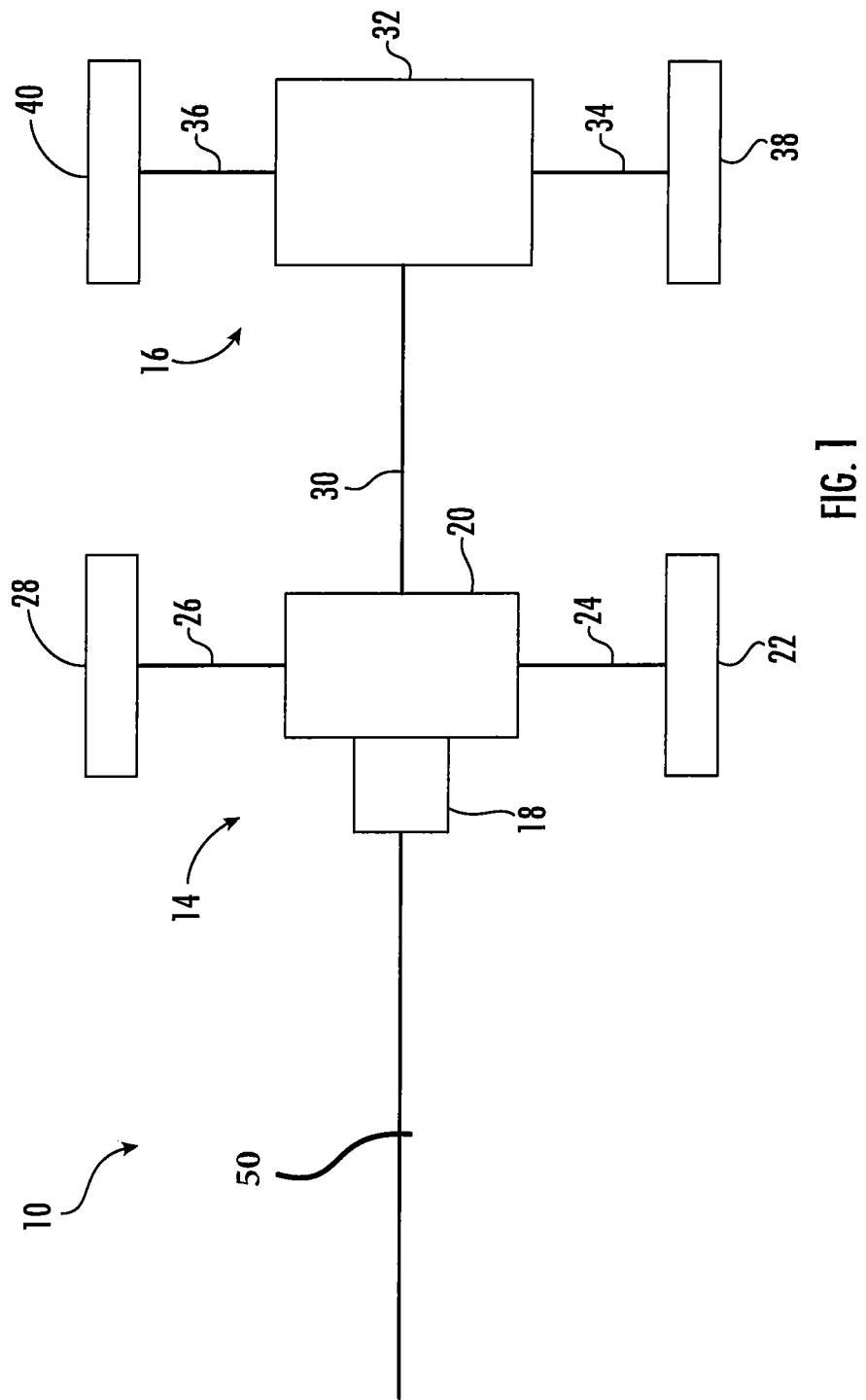
FIG. 1 is a schematic top-plan view of a tandem axle assembly having an inter-axle differential locking system according to an embodiment of the disclosure.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the method of controlling a tandem axle assembly in a tandem axle vehicle disclosed herein may be used in automotive, off-road vehicle, all-terrain vehicle, construction, structural, marine, aerospace, locomotive, military, and/or agriculture applications. Additionally, as a non-limiting examples, the method of controlling a tandem axle assembly in a tandem axle vehicle disclosed herein may also be used in passenger vehicle, electric vehicle, hybrid vehicle, commercial vehicle, autonomous vehicles, semi-autonomous vehicles and/or heavy vehicle applications.

For description purposes, those having ordinary skill in the art would recognize that the term "control unit" as used herein to indicate electronic hardware, software stored on a one or more non-transitory computer readable storage media and executable by a processor. In some embodiments, a non-transitory computer readable storage medium includes, by way of non-limiting examples CD-ROMs, DVDs, flash memory devices, solid state memory, magnetic disk drives, optical disk drives, cloud computing systems and services, and the like.

Those of skill will recognize that the various illustrative logical blocks, modules, circuits, and algorithm steps described in connection with the embodiments disclosed herein, including with reference to the control system described herein, for example, can be implemented as electronic hardware, software stored on a computer readable medium and executable by a processor, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present embodiments. For example, various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Software associated with such modules can reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor reads information from, and write information to, the storage medium. In the alternative, the storage medium can be integral to the processor. The processor and the storage medium can reside in an ASIC. For examples, in some embodiment, a control unit or controller for use of control of the tandem axle assembly includes a processor.

Figure 3:
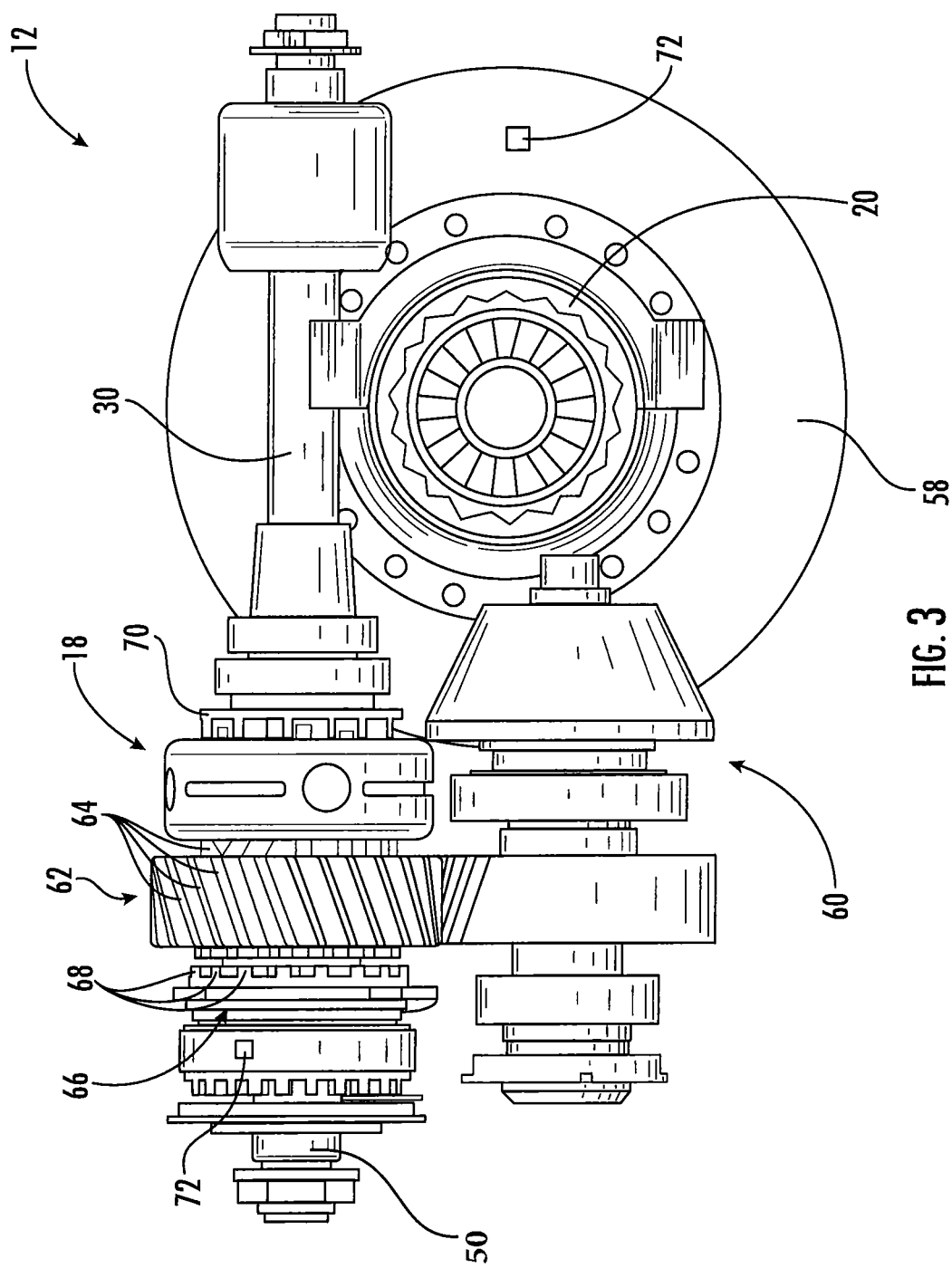
FIG. 3 is a schematic cut-away side view of the inter-axle differential locking system according to the embodiment illustrated in FIG. 1.

FIG. 1 is a schematic top-plan view of a tandem axle assembly 10 having an inter-axle differential locking system 12 (as shown in FIG. 3) according to an embodiment of the disclosure. The tandem axle assembly 10 includes a front tandem axle assembly 14 and a rear tandem axle assembly 16. The inter-axle differential locking system 12 is located on the front tandem axle assembly 14. In some embodiments, the tandem axle assembly 10 receives rotational power through an input shaft 50 that is rotated by an engine or a prime mover.

The inter-axle differential locking system 12 includes an inter-axle differential 18, also known as a power divider unit (PDU), that divides the rotational power/torque generated by an engine or prime mover (not shown) between the front tandem axle assembly 14 and the rear tandem axle assembly 16. The inter-axle differential 18 is connected to the input shaft 50 and is selectively drivingly connected to a front tandem axle differential 20 and an intermediate shaft 30.

In some embodiments, the inter-axle differential 18 may be a bevel gear-style differential; however, it is understood that other differential arrangements may be used. The front tandem axle assembly 14 further includes a first front tandem axle half shaft 24 and a second front tandem axle half shaft 26. One end of the first front tandem axle half shaft 24 is drivingly connected to a first front tandem axle wheel hub assembly 22 and the other end of the first front tandem axle half shaft 24 is drivingly connected to the front tandem axle differential 20.

In some embodiments, the front tandem axle differential 20 includes a traditional bevel differential gear set implemented to transmit rotational power to the front tandem axle assembly 14 and the rear tandem axle assembly 16

In some embodiments, the first front tandem axle wheel hub assembly 22 is a locking wheel hub assembly.

One end of the second front tandem axle half shaft 26 is drivingly connected to a second front tandem axle wheel hub assembly 28 and the other end of the second front tandem axle half shaft 26 is drivingly connected to an end of front tandem axle differential 20. One end of the intermediate shaft 30 is drivingly connected to the inter-axle differential 18 and the other end is drivingly connected to the rear tandem axle assembly 16 providing rotational power thereto.

In some embodiments, the second front tandem axle wheel hub assembly 28 is a locking wheel hub assembly.

As illustrated in FIG. 1 of the disclosure and as a non-limiting example, the intermediate shaft 30 extends from the front tandem axle assembly 14 to a rear tandem axle differential 32 of the rear tandem axle assembly 16.

In some embodiments, the rear tandem axle differential 32 includes a traditional bevel differential gear set implemented to transmit rotational power to the front tandem axle assembly 14 and the rear tandem axle assembly 16.

The rear tandem axle assembly 16 further includes first rear tandem axle half shaft 34 and a second rear tandem axle half shaft 36. The first rear tandem axle half shaft 34 extends substantially perpendicular to the intermediate shaft 30. One end of the first rear tandem axle half shaft 34 is drivingly connected to a first rear tandem axle wheel hub assembly 38 and the other end of the first rear tandem axle half shaft 24 is drivingly connected to the rear tandem axle differential 32.

One end of the second rear tandem axle half shaft 36 is drivingly connected to a second rear tandem axle wheel hub assembly 40 and the other end of the second rear tandem axle half shaft 36 to rear tandem axle differential 32.

In some embodiments, the first rear tandem axle wheel hub assembly 38 and/or the second rear tandem axle wheel hub assembly 40 may be locking wheel hub assemblies.

Figure 2:
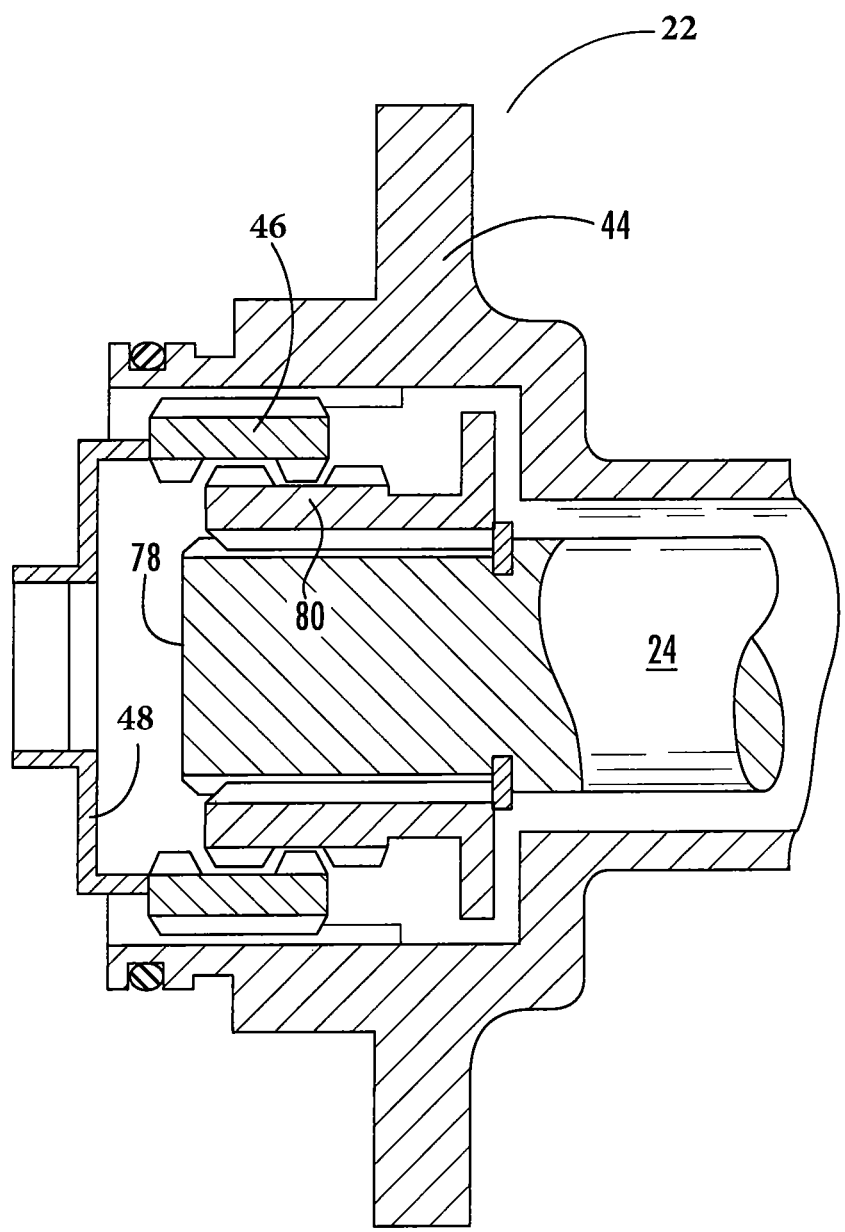
FIG. 2 is a schematic cut-away side view of a first front tandem axle half shaft connected to the first front tandem axle wheel hub assembly according to the embodiment illustrated in FIG. 1.

Referring to FIG. 2, FIG. 2 is a schematic cut-away side view of the first front tandem axle half shaft 24 connected to the first front tandem axle wheel hub assembly 22 according to the embodiment illustrated in FIG. 1. The first front tandem axle wheel hub assembly 22 includes one or more wheels directly mounted to one or more hubs 44. In a non-limiting example of the disclosure, the number of wheels may equal the number of hubs 44.

In some embodiments, the one or more hubs 44 are automatic locking hubs.

The first front tandem axle wheel hub assembly 22 also includes one or more clutch members 46 movable relative to the one or more hubs 44 and the first front tandem axle half shaft 24. The one or more clutch members 46 selectively connect (lock) and disconnect (unlock) the one or more hubs 44 (and the first front tandem axle wheel hub assembly 22) with the first front tandem axle half shaft 24.

As best seen in FIG. 2 and as a non-limiting example, an end 78 of the first front tandem axle half shaft 24 may be received within the one or more hubs 44. A drive gear 80 may be mounted on the end 78 of the first front tandem axle half shaft 24. The clutch member 46 may be engaged with the one or more hubs 44 and may be slidably moveable to selectively engage with the drive gear 80. When the clutch member 46 is engaged with the drive gear 80, the one or more hubs 44 may be coupled to the first front tandem axle half shaft 24. When the clutch member 46 is disengaged from the drive gear 80, the one or more hubs 44 may be disengaged from the first front tandem axle half shaft 24.

Figure 4:
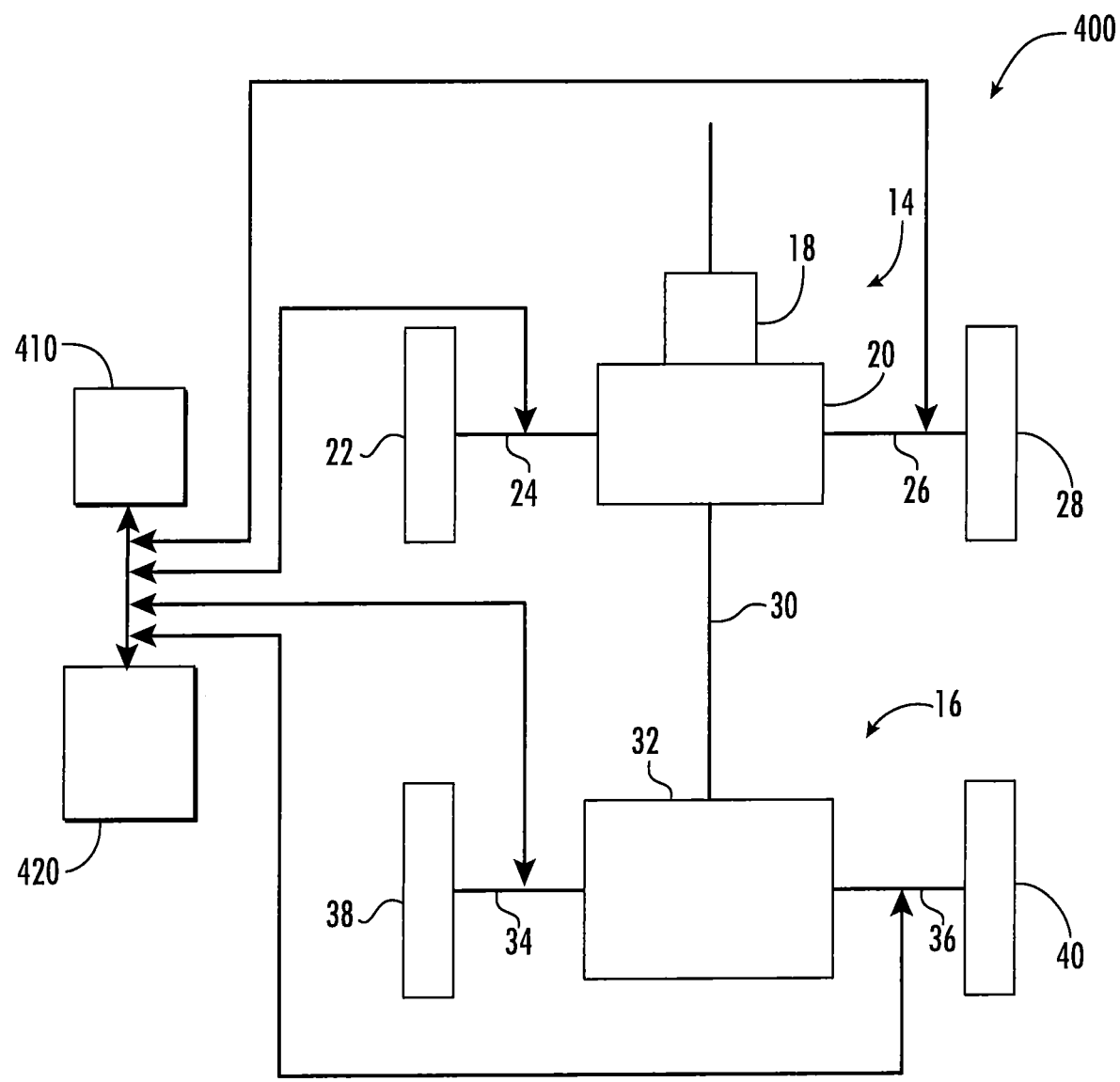
FIG. 4 is a block diagram schematic of a tandem axle control assembly including the tandem axle assembly according to the embodiment illustrated in FIG. 1.

As shown in FIG. 2, the first front tandem axle wheel hub assembly 22 further includes one or more first actuators 48. The one or more first actuators 48 are selectively operable to induce axial movement of the one or more one or more hubs 44. The one or more first actuators 48 are controlled by an electronic control unit 410 (as shown in FIG. 4).

In some embodiments, the one or more first actuators 48 are electric actuators, linear actuators, pneumatic actuators, hydraulic actuators, electro-mechanical actuators, and/or electro-magnetic actuators.

The second front tandem axle wheel hub assembly 28 has the same components as the first front tandem axle wheel hub assembly 22 and is selectively connected to the second front tandem axle half shaft 26.

Referring to FIG. 3, FIG. 3 is a schematic cut-away side view of the inter-axle differential locking system 12 according to the embodiment illustrated in FIG. 1. As shown in FIG. 3, the inter-axle differential 18 may be drivingly connected to the front tandem axle differential 20 through the intermediate shaft 30. Integrally connected to at least a portion of the front tandem axle differential 20 is a differential ring gear 58. The differential ring gear 58 may be engaged with a pinion gear 60 on the front tandem axle assembly 14.

As a non-limiting example, the differential ring gear 58 may be integrally connected to at least a portion of the front tandem axle differential 20 by using one or more mechanical fasteners, one or more welds, one or more adhesives, a spline connection and/or a threaded connection.

As shown in FIG. 3, inter-axle differential locking system 12 further includes a helical side gear 62, the helical side gear 62 may include a plurality of helical side gear teeth 64 interposed between the inter-axle differential 18 and a sliding clutch 66. The sliding clutch 66 may include a plurality of sliding clutch teeth 68. The sliding clutch teeth 68 are complementary to and may selectively engage, such as meshingly engage, and disengage with the helical side gear teeth 64.

As best seen in FIG. 3 and as a non-limiting example, the inter-axle differential locking system 12 may include one or more intermediate shaft side gears 70. The one or more intermediate shaft side gears 70 may be drivingly connected to the intermediate shaft 30. The intermediate shaft side gears 70 may also selectively engage and disengage with the inter-axle differential 18.

When the sliding clutch teeth 68 are engaged with the helical side gear teeth 64, the inter-axle differential 18 may be locked/engaged as a single unit with the helical side gear 62 and the one or more intermediate shaft side gears 70. The result is the elimination of any differential action on the tandem axle assembly 10. When the sliding clutch teeth 68 are disengaged from the helical side gear teeth 64, the inter-axle differential 18 is unlocked/disengaged from the helical side gear 62 and/or the one or more intermediate shaft side gears 70. As a result, differential action occurs on the tandem axle assembly 10.

As best seen in FIG. 3 and as a non-limiting example, one or more sensors 72 are positioned on the differential ring gear 58 and/or on the sliding clutch 66. The one or more sensors 72 may be speed sensors, torque load sensors, and/or temperature sensors.

In other embodiments, one or more sensors 72 may be positioned on the first front tandem axle half shaft 24, the second front tandem axle half shaft 26, the first rear tandem axle half shaft 34, the intermediate shaft 30, and/or a second rear tandem axle half shaft 36.

In some embodiments, speed may be measured through a vehicle bus (not shown), such as the J1939 Can Bus.

Referring to FIG. 4, FIG. 4 is a block diagram schematic of a tandem axle control assembly 400 including the tandem axle assembly 10 according to the embodiment illustrated in FIG. 1. The control assembly 400 includes an electronic control unit 410 that may be operably configured to receive data in the form of a signal from the one or more sensors 72.

The one or more sensors may be positioned on the sliding clutch 66, the differential ring gear 58, the first front tandem axle half shaft 24, the second front tandem axle half shaft 26, the first rear tandem axle half shaft 34, the intermediate shaft 30, and/or the second rear tandem axle half shaft 36. When the one or more sensors 72 are positioned on the sliding clutch 66, the one or more sensors 72 sense the presence and absence of the sliding clutch teeth 68 based on their engagement or disengagement with the helical side gear teeth 64. The control assembly 400 may be operably configured to convert the signal that it receives into revolutions per minute.

The tandem axle control assembly 400 also includes a data port 420 operably configured for communicating the speed of the vehicle to the electronic control unit 410. The electronic control unit 410 is operably configured to process the information it receives from the one or more sensors 72, the one or more first actuators 48, and the data port 420, to determine the speed of the vehicle, and to compare the determined speed to a predetermined speed.

The electronic control unit 410 is also operably configured to command the differential locking system 12 to lock or unlock the inter-axle differential 18 based on the speed of the vehicle as compared to a predetermined speed. In a non-limiting example of the disclosure, the predetermined speed of the vehicle may be 50 miles/hour.

Based on the foregoing, it can be appreciated that the tandem axle assembly 10 can operated in different modes. A first mode of operation may be used for startup and/or low-speed (e.g., below 50 miles/hour) conditions, in which improved traction is needed. In an embodiment of the first mode, the inter-axle differential 18 is unlocked and the first front tandem axle wheel hub assembly 22 is connected to and engaged with the first front tandem axle half shaft 24 and/or the second front tandem axle wheel hub assembly 28 is connected to and engaged with the second front tandem axle half shaft 26.

When the first front tandem axle wheel hub assembly 22 is connected to the first front tandem axle half shaft 24, the one or more hubs 44 may be locked to the one or more wheels. When the second front tandem axle wheel hub assembly 28 is connected to the second front tandem axle half shaft 26, the one or more hubs 44 may be locked to the one or more wheels. The result is that rotational energy is being provided to the front tandem axle assembly 14.

In some embodiments, exactly one hub 44 is locked to one wheel. In other embodiments, a plurality of hubs 44 are locked to a plurality of wheels.

In an alternative embodiment of the first mode, the inter-axle differential 18 is unlocked and the first rear tandem axle wheel hub assembly 38 is connected to and engaged with the first rear tandem axle half shaft 34 and/or the second rear tandem axle wheel hub assembly 40 is connected to and engaged with the second rear tandem axle half shaft 36. As a result, the one or more hubs 44 on the first rear tandem axle wheel hub assembly 38 and/or the one or more hubs 44 on the second rear tandem axle wheel hub assembly 40 may be locked to their respective wheels.

A second mode of operation may be used for favorable conditions at increased/cruising speeds to improve efficiency. In an embodiment this second mode, the inter-axle differential 18 is locked and the first front tandem axle wheel hub assembly 22 is disconnected from the first front tandem axle half shaft 24 and/or the second front tandem axle wheel hub assembly 28 is disconnected from the second front tandem axle half shaft 26. As a result, the rotational power may be transmitted to the rear tandem axle assembly 16.

When the first front tandem axle wheel hub assembly 22 is disconnected from the first front tandem axle half shaft 24, the one or more hubs 44 may be unlocked from the one or more wheels. When the second front tandem axle wheel hub assembly 28 is disconnected from the second front tandem axle half shaft 26, the one or more hubs 44 may be unlocked from the one or more wheels. When the one or more hubs 44 are unlocked, the one or more wheels can freely rotate. This reduces the torque load on the front tandem axle assembly 14 since the torque load is substantially present on the rear tandem axle assembly 16, which improves the fuel efficiency of the vehicle.

In some embodiments, exactly one hub 44 is locked to one wheel.

In other embodiments, a plurality of hubs 44 are locked to a plurality of wheels.

Figure 5:
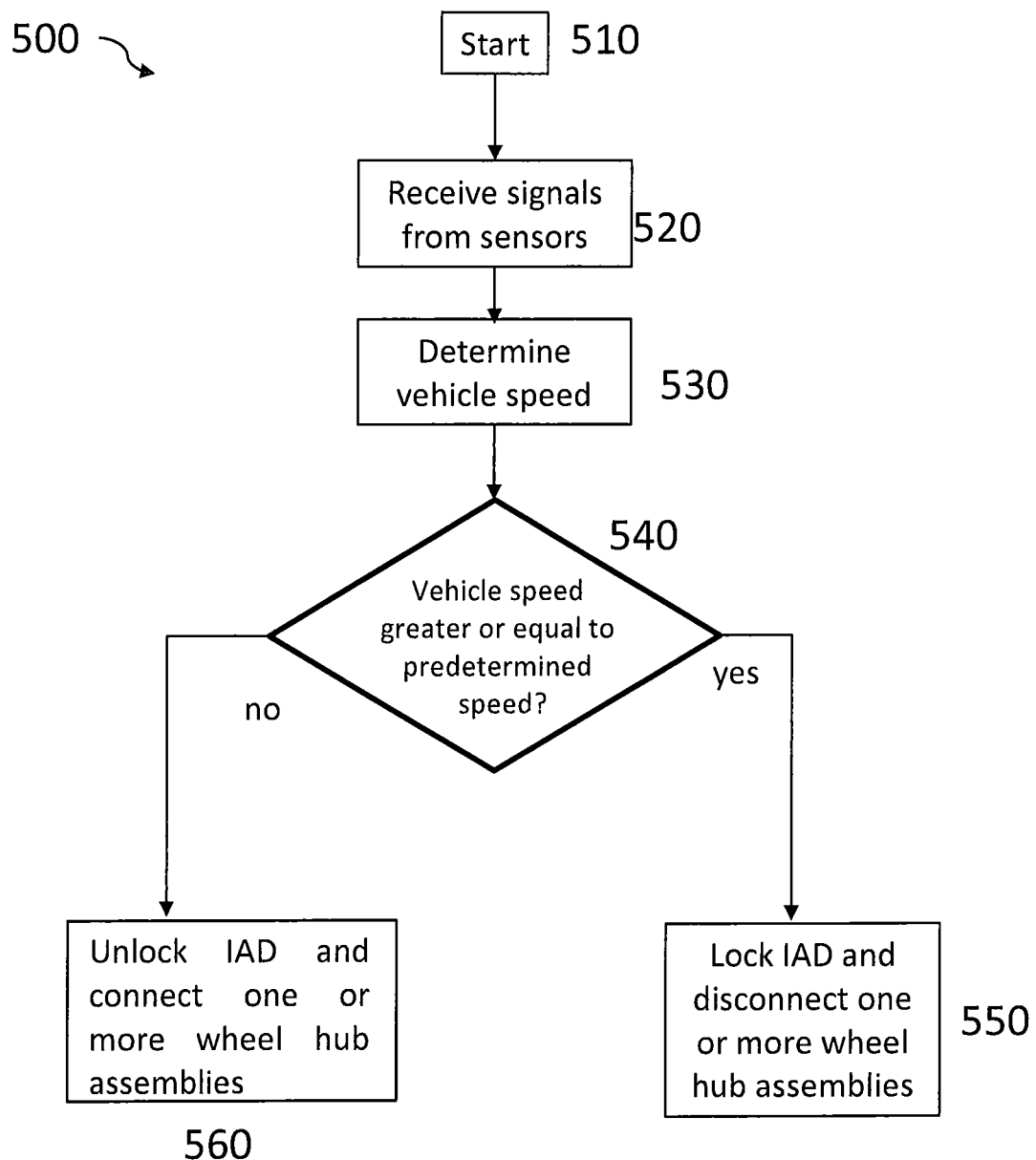
FIG. 5 is a flow chart depicting a process implementable in the tandem axle control assembly illustrated in FIG. 4.

Referring to FIG. 5, FIG. 5 is a flow chart depicting an exemplary process 500 implementable in the tandem axle control assembly 400 illustrated in FIG. 4. The process 500 begins at a start state 510.

Next, at block 520, one or more signals from the one or more sensors 72 on the tandem axle assembly 10 are received by the electronic control unit 410. The one or more signals received by the electronic control unit 410 are indicative of a rotational speed of the sliding clutch 66, a rotational speed of the differential ring gear 58, a rotational speed of the first front tandem axle half shaft 24, a rotational speed of the second front tandem axle half shaft 26, a rotational speed of the first rear tandem axle half shaft 34, a rotational speed of the intermediate shaft 30, and/or a rotational speed of the second rear tandem axle half shaft 36.

Next, the speed of the vehicle is determined in block 530. The speed of the vehicle may be determined from the rotational speed of the first front tandem axle half shaft 24, the rotational speed of the second front tandem axle half shaft 26, the rotational speed of the first rear tandem axle half shaft 34, the rotational speed of the intermediate shaft 30, and/or the rotational speed of the second rear tandem axle half shaft 36.

The process 500 then proceeds to an evaluation block 540 where the speed of the vehicle is compared to a predetermined vehicle speed via the electronic control unit 410. The predetermined speed is stored in the electronic control unit 410.

In some embodiments, the predetermined speed may be based on vehicle application and may be set by the manufacturer of the vehicle or the manufacturer of the tandem axle assembly 10. In other embodiments, the predetermined speed may be programmed at a dealership or service provider.

As best seen in FIG. 5 and as a non-limiting example, if the speed of the vehicle is equal to or greater than the predetermined vehicle speed (e.g., 50 miles/hour), the electronic control unit 410 transmits a signal to the tandem axle assembly 10 commanding (i) the inter-axle differential 18 to lock and (ii) the first front tandem axle wheel hub assembly 22 to disconnect from the first front tandem axle half shaft 24 and/or the second front tandem axle wheel hub assembly 28 to disconnect from the second front tandem axle half shaft 26, as shown in block 550.

In another embodiment, if the speed of the vehicle is equal to or greater than the predetermined vehicle speed (e.g., 50 miles/hour), the electronic control unit 410 transmits a signal to the tandem axle assembly 10 commanding (i) the inter-axle differential 18 to lock and (ii) the first rear tandem axle wheel hub assembly 38 to disconnect from the first rear tandem axle half shaft 34 and/or the second rear tandem axle wheel hub assembly 40 to disconnect from the second rear tandem axle half shaft 36.

As best seen in FIG. 5 and as a non-limiting example, if the speed of the vehicle is below the predetermined vehicle, the electronic control unit 410 transmits a signal to the tandem axle assembly 10 commanding (i) the inter-axle differential 18 to unlock and (ii) the first front tandem axle wheel hub assembly 22 to connect to the first front tandem axle half shaft 24 and/or the second front tandem axle wheel hub assembly 28 to connect to the second front tandem axle half shaft 26, as shown in block 560.

In another embodiment, if the speed of the vehicle is below the predetermined vehicle, the electronic control unit 410 transmits a signal to the tandem axle assembly 10 commanding (i) the inter-axle differential 18 to unlock and (ii) the first rear tandem axle wheel hub assembly 38 to connect to the first rear tandem axle half shaft 34 and/or the second rear tandem axle wheel hub assembly 40 to connect to the second rear tandem axle half shaft 36.

In some embodiments, prior to the inter-axle differential 18 being unlocked, the first front tandem axle wheel hub assembly 22 is connected to the first front tandem axle half shaft 24, the second front tandem axle wheel hub assembly 28 is connected to the second front tandem axle half shaft 26, the first rear tandem axle wheel hub assembly 38 is connected to the first rear tandem axle half shaft 34, and/or the second rear tandem axle wheel hub assembly 40 is connected to the second rear tandem axle half shaft 36.

In some embodiments, the process 500 may then continue to transition between blocks 550 and 560, depending on the speed of the vehicle.

In other embodiments, the process 500 then begins again at the start state 510.

Figure 6:
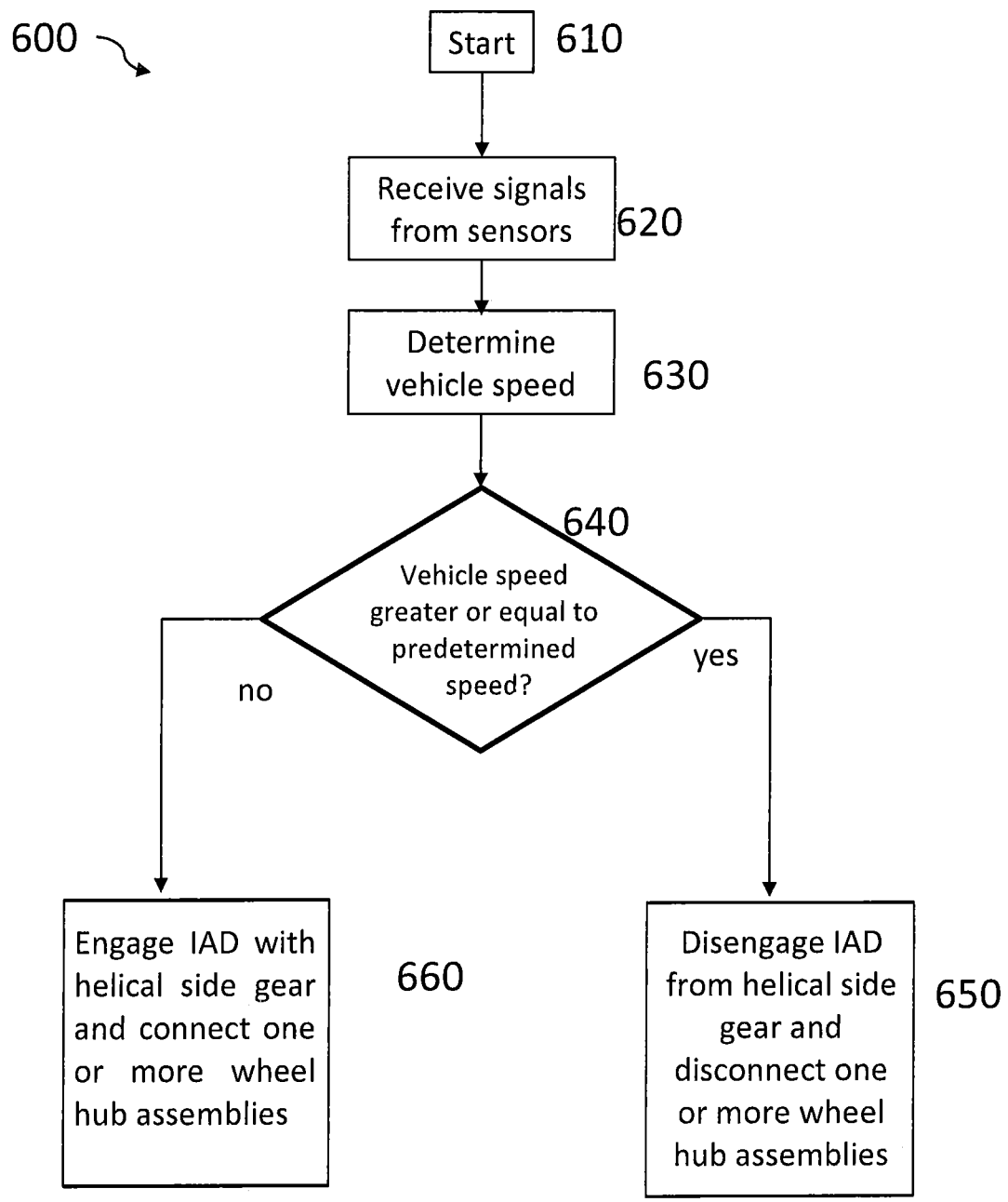
FIG. 6 is a flow chart depicting a second process implementable in the tandem axle control assembly illustrated in FIG. 4.

Referring to FIG. 6, FIG. 6 is a flow chart depicting a second process 600 implementable in the tandem axle control assembly 400 illustrated in FIG. 4. The process 600 begins at a start state 610.

Next, at block 620, one or more signals from the one or more sensors 72 on the tandem axle assembly 10 are received by the electronic control unit 410. The one or more signals received by the electronic control unit 410 are indicative of a rotational speed of the sliding clutch 66, a rotational speed of the differential ring gear 58, a rotational speed of the first front tandem axle half shaft 24, a rotational speed of the second front tandem axle half shaft 26, a rotational speed of the first rear tandem axle half shaft 34, a rotational speed of the intermediate shaft 30, and/or a rotational speed of the second rear tandem axle half shaft 36.

Next, the speed of the vehicle is determined in block 630. The speed of the vehicle may be determined from the rotational speed of the first front tandem axle half shaft 24, the rotational speed of the second front tandem axle half shaft 26, the rotational speed of the first rear tandem axle half shaft 34, the rotational speed of the intermediate shaft 30, and/or the rotational speed of the second rear tandem axle half shaft 36.

The process 600 then proceeds to an evaluation block 640 where the speed of the vehicle is compared to a predetermined vehicle speed via the electronic control unit 410. The predetermined speed is stored in the electronic control unit 410.

In some embodiments, the predetermined speed may be based on vehicle application and may be set by the manufacturer of the vehicle or the manufacturer of the tandem axle assembly 10. In other embodiments, the predetermined speed may be programmed at a dealership or service provider.

As best seen in FIG. 6 and as a non-limiting example, if the speed of the vehicle is equal to or greater than the predetermined vehicle speed (e.g., 50 miles/hour), the electronic control unit 410 transmits a signal to the tandem axle assembly 10 commanding (i) the first front tandem axle wheel hub assembly 22 to disconnect from the first front tandem axle half shaft 24 and/or the second front tandem axle wheel hub assembly 28 to disconnect from the second front tandem axle half shaft 26 and (ii) the inter-axle differential 18 and the one or more intermediate shaft side gears 70 to disengage from the helical side gear 62 by sliding/shifting the inter-axle differential 18 and the one or more intermediate shaft side gears 70 toward the intermediate shaft 30, as shown in block 650. The result is the transmission of rotational power through the input shaft 50 to the rear tandem axle assembly 16 via the inter-axle differential 18 to the one or more intermediate shaft side gears 70.

The inter-axle differential 18 and the one or more intermediate shaft side gears 70 may be shifted using one or more second actuators (not shown). In some embodiments, the one or more second actuators may be one or more ball ramps, one or more solenoids, one or more electric actuators, one or more linear actuators, one or more pneumatic actuators, one or more hydraulic actuators, one or more electro-mechanical actuators, and/or one or more electro-magnetic actuators.

As best seen in FIG. 6 and as a non-limiting example, if the speed of the vehicle is below the predetermined vehicle, the electronic control unit 410 transmits a signal to the tandem axle assembly 10 commanding (i) the first front tandem axle wheel hub assembly 22 to connect to the first front tandem axle half shaft 24 and/or the second front tandem axle wheel hub assembly 28 to connect to the second front tandem axle half shaft 26 and (ii) the inter-axle differential 18 and the one or more intermediate shaft side gears 70 to engage with the helical side gear 62, as shown in block 660.

In some embodiments, prior to the inter-axle differential 18 and the one or more intermediate shaft side gears 70 engaging with the helical side gear 62, the first front tandem axle wheel hub assembly 22 is connected to the first front tandem axle half shaft 24 and/or the second front tandem axle wheel hub assembly 28 is connected to the second front tandem axle half shaft 26.

In some embodiments, the process 600 may then continue to transition between blocks 650 and 660, depending on the speed of the vehicle.

In other embodiments, the process 600 then begins again at the start state 610.

Figure 7:
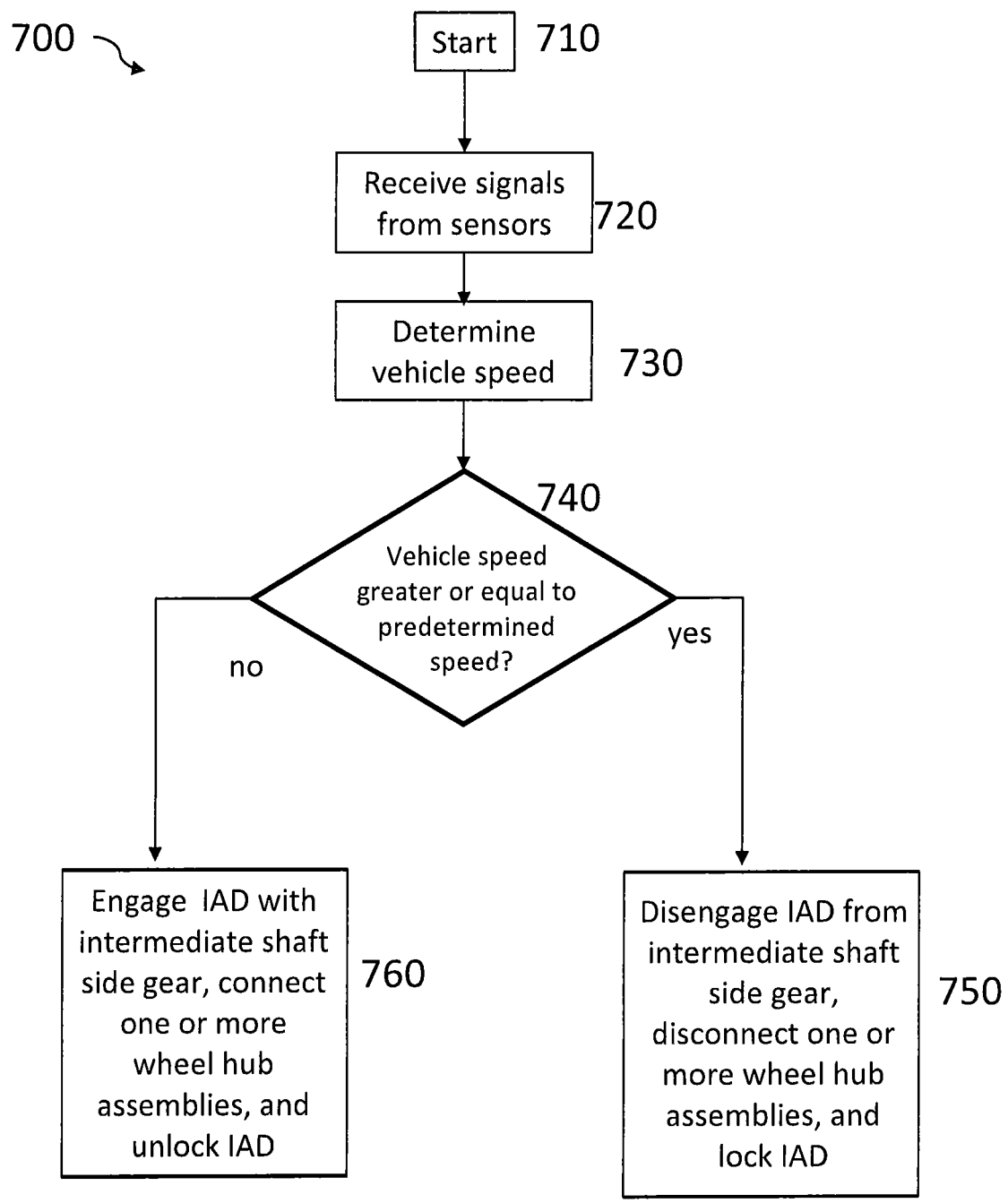
FIG. 7 is a flow chart depicting a third process implementable in the tandem axle control assembly illustrated in FIG. 4.

Referring to FIG. 7, FIG. 7 is a flow chart depicting a third process 700 implementable in the tandem axle control assembly 400 illustrated in FIG. 4. The process 700 begins at a start state 710.

Next, at block 720, one or more signals from the one or more sensors 72 on the tandem axle assembly 10 are received by the electronic control unit 410. The one or more signals received by the electronic control unit 410 are indicative of a rotational speed of the sliding clutch 66, a rotational speed of the differential ring gear 58, a rotational speed of the first front tandem axle half shaft 24, a rotational speed of the second front tandem axle half shaft 26, a rotational speed of the first rear tandem axle half shaft 34, a rotational speed of the intermediate shaft 30, and/or a rotational speed of the second rear tandem axle half shaft 36.

Next, the speed of the vehicle is determined in block 730. The speed of the vehicle may be determined from the rotational speed of the first front tandem axle half shaft 24, the rotational speed of the second front tandem axle half shaft 26, the rotational speed of the first rear tandem axle half shaft 34, the rotational speed of the intermediate shaft 30, and/or the rotational speed of the second rear tandem axle half shaft 36.

The process 700 then proceeds to an evaluation block 740 where the speed of the vehicle is compared to a predetermined vehicle speed via the electronic control unit 410. The predetermined speed is stored in the electronic control unit 410.

In some embodiments, the predetermined speed may be based on vehicle application and may be set by the manufacturer of the vehicle or the manufacturer of the tandem axle assembly 10. In other embodiments, the predetermined speed may be programmed at a dealership or service provider.

As best seen in FIG. 7 and as a non-limiting example, if the speed of the vehicle is equal to or greater than the predetermined vehicle speed (e.g., 50 miles/hour), the electronic control unit 410 transmits a signal to the tandem axle assembly 10 commanding (i) the first rear tandem axle wheel hub assembly 38 to disconnect from the first rear tandem axle half shaft 34 and/or the second rear tandem axle wheel hub assembly 40 to disconnect from the second rear tandem axle half shaft 36; (ii) the inter-axle differential 18 to disengage from the one or more intermediate shaft side gears 70 by sliding/shifting the inter-axle differential 18 and the one or more intermediate shaft side gears 70 toward the intermediate shaft 30; and (iii) the inter-axle differential 18 to lock, as shown in block 750. The result is the transmission of rotational power through the input shaft 50 to the front tandem axle assembly 14 via the helical side gear 62 to the pinion gear 60.

The inter-axle differential 18 and the one or more intermediate shaft side gears 70 may be shifted using one or more second actuators (not shown). In some embodiments, the one or more second actuators may be one or more ball ramps, one or more solenoids, one or more electric actuators, one or more linear actuators, one or more pneumatic actuators, one or more hydraulic actuators, one or more electro-mechanical actuators, and/or one or more electro-magnetic actuators.

As best seen in FIG. 7 and as a non-limiting example, if the speed of the vehicle is below the predetermined vehicle, the electronic control unit 410 transmits a signal to the tandem axle assembly 10 commanding (i) the first rear tandem axle wheel hub assembly 38 to connect to the first rear tandem axle half shaft 34 and/or the second rear tandem axle wheel hub assembly 40 to connect to the second rear tandem axle half shaft 36; (ii) the inter-axle differential 18 to engage with the one or more intermediate shaft side gears 70; and (iii) the inter-axle differential 18 to unlock, as shown in block 760.

In some embodiments, prior to the inter-axle differential 18 engaging with the one or more intermediate shaft side gears 70 and the inter-axle differential 18 unlocking, the first rear tandem axle wheel hub assembly 38 is connected to the first rear tandem axle half shaft 34 and/or the second rear tandem axle wheel hub assembly 40 is connected to the second rear tandem axle half shaft 36.

In some embodiments, the process 700 may then continue to transition between blocks 750 and 760, depending on the speed of the vehicle.

In other embodiments, the process 700 then begins again at the start state 710.

In accordance with an embodiment of the disclosure and as a non-limiting example, the present disclose may relate to a tridem axle assembly.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A method of controlling a tandem axle assembly in a vehicle, the tandem axle assembly including an inter-axle differential locking system comprising an inter-axle differential (IAD), a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies, the method comprising:
   determining a speed of the vehicle;
   comparing the determined speed of the vehicle to a predetermined speed;
   commanding the IAD to lock; and the front tandem axle wheel hub assemblies to disconnect from the pair of front tandem axle half shafts and/or the pair of rear tandem axle wheel hub assemblies to disconnect from the pair of rear tandem axle half shafts when the determined speed of the vehicle is greater or equal to the predetermined speed; and
   commanding the IAD to unlock; and the pair of front tandem axle wheel hub assemblies to connect to the pair of front tandem axle half shafts and/or the pair of rear tandem axle wheel hub assemblies to connect to the pair of rear tandem axle half shafts when the determined speed of the vehicle is lower than the predetermined speed.

2. The method of claim 1, wherein the pair of front tandem axle wheel hub assemblies and the pair of rear tandem axle wheel hub assembles each include one or more automatic locking hubs directly mounted to one or more wheels, one or more clutch members movable relative to the one or more automatic locking hubs, the pair of front tandem axle half shafts, and the pair of rear tandem axle half shafts, and one or more actuators selectively operable to induce axial movement of the one or more automatic locking hubs.

3. The method of claim 1, wherein determining the speed of the vehicle includes measuring the rotational speed of a sliding clutch, a differential ring gear, one of the front tandem axle half shafts, and/or one of the rear tandem axle half shafts.

4. The method of claim 3, wherein the rotational speed is measured using one or more sensors on the sliding clutch, the differential ring gear, one of the front tandem axle half shafts, and/or one of the rear tandem axle half shafts.

5. The method of claim 1, wherein the inter-axle differential locking system includes a helical side gear and a sliding clutch, wherein the helical side gear includes a plurality of helical side gear teeth and the sliding clutch includes a plurality of sliding clutch teeth, and wherein the plurality of sliding clutch teeth is selectively engaged with the plurality of helical side gear teeth.

6. The method of claim 5, wherein the IAD is locked when the plurality of sliding clutch teeth is engaged with the plurality of helical side gear teeth and the IAD is unlocked when the plurality of sliding clutch teeth is disengaged from the plurality of helical side gear teeth.

7. The method of claim 1, wherein the pair of front tandem axle wheel hub assemblies are connected to the pair of front tandem axle half shafts and the pair of rear tandem axle wheel hub assemblies are connected to the pair of rear tandem axle half shafts prior to unlocking the IAD when the determined speed of the vehicle is lower than the predetermined speed.

8. A method of controlling a tandem axle assembly in a vehicle, the tandem axle assembly including an inter-axle differential locking system comprising an inter-axle differential (IAD), a helical side gear, a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies, the method comprising:
   determining a speed of the vehicle;
   comparing the determined speed of the vehicle to a predetermined speed;
   commanding the pair of front tandem axle wheel hub assemblies to disconnect from the pair of front tandem axle half shafts; and the IAD to move out of engagement with the helical side gear when the determined speed of the vehicle is greater or equal to the predetermined speed; and
   commanding the pair of front tandem axle wheel hub assemblies to connect to the pair of front tandem axle half shafts; and the IAD to engage with the helical side gear when the determined speed of the vehicle is lower than the predetermined speed.

9. The method of claim 8, wherein the pair of front tandem axle wheel hub assemblies includes one or more automatic locking hubs directly mounted to one or more wheels, one or more clutch members movable relative to the one or more automatic locking hubs and the pair of front tandem axle half shafts, and one or more first actuators selectively operable to induce axial movement of the one or more automatic locking hubs.

10. The method of claim 8, wherein the IAD is moved out of engagement from the helical side gear using one or more second actuators.

11. The method of claim 8, wherein determining the speed of the vehicle includes measuring a rotational speed of a sliding clutch, a differential ring gear, one of the front tandem axle half shafts, and/or one of the rear tandem axle half shafts.

12. The method of claim 11, wherein the rotational speed is measured using one or more sensors on the sliding clutch, the differential ring gear, one of the front tandem axle half shafts, and/or one of the rear tandem axle half shafts.

13. The method of claim 8, wherein the pair of front tandem axle wheel hub assemblies are connected to the pair of front tandem axle half shafts prior to engaging the IAD with the helical side gear when the determined speed of the vehicle is lower than the predetermined speed.

14. A method of controlling a tandem axle assembly in a vehicle, the tandem axle assembly including an inter-axle differential locking system comprising an intermediate shaft, an inter-axle differential (IAD) drivingly connected to the intermediate shaft, an intermediate shaft side gear, a front tandem axle assembly having a pair of front tandem axle half shafts selectively connected to a pair of front tandem axle wheel hub assemblies and a rear tandem axle assembly having a pair of rear tandem axle half shafts selectively connected to a pair of rear tandem axle wheel hub assemblies, the method comprising:
   determining a speed of the vehicle;
   comparing the determined speed of the vehicle to a predetermined speed;
   commanding the pair of rear tandem axle wheel hub assemblies to disconnect from the pair of rear tandem axle half shafts; the IAD to move out of engagement with the intermediate shaft side gear; and the IAD to lock when the determined speed of the vehicle is greater or equal to the predetermined speed; and
   commanding the pair of rear tandem axle wheel hub assemblies to connect to the pair of rear tandem axle half shafts; the IAD to engage with the intermediate shaft side gear; and the IAD to unlock when the determined speed of the vehicle is lower than the predetermined speed.

15. The method of claim 14, wherein the pair of rear tandem axle wheel hub assemblies includes one or more automatic locking hubs directly mounted to one or more wheels, one or more clutch members movable relative to the one or more automatic locking hubs and the pair of front tandem axle half shafts, and one or more first actuators selectively operable to induce axial movement of the one or more automatic locking hubs.

16. The method of claim 14, wherein the IAD is moved out of engagement from the intermediate shaft side gear using one or more second actuators.

17. The method of claim 14, wherein determining the speed of the vehicle includes measuring a rotational speed of a sliding clutch, a differential ring gear, one of the front tandem axle half shafts, and/or one of the rear tandem axle half shafts.

18. The method of claim 17, wherein the rotational speed is measured using one or more sensors on the sliding clutch, the differential ring gear, one of the front tandem axle half shafts, and/or one of the rear tandem axle half shafts.

* * * * *